Figure 1:
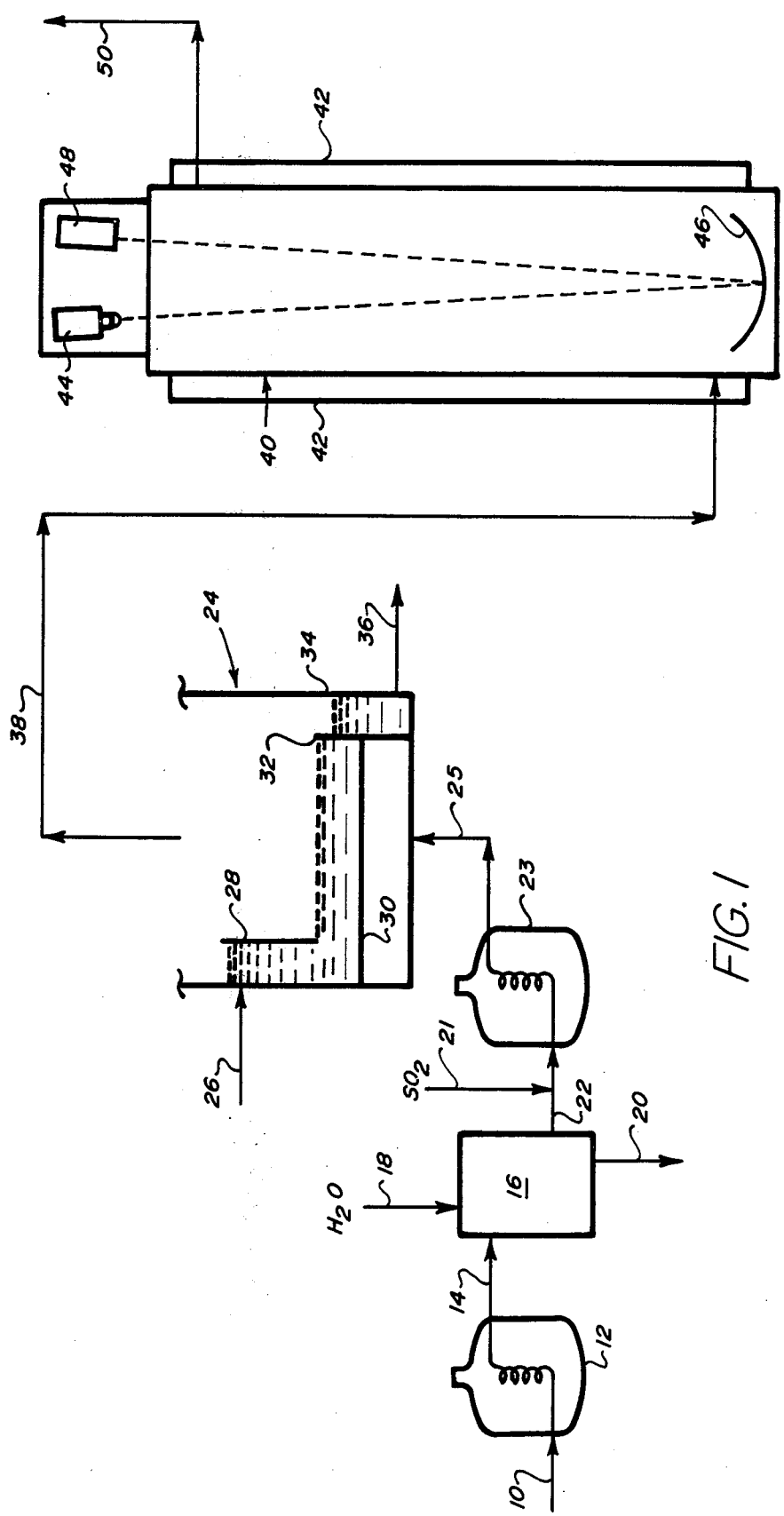

United States Patent [19]

Ciuryla et al.

[11] 4,151,263

[45] Apr. 24, 1979

[54] REMOVAL OF SULFUR OXIDES FROM GASES BY SCRUBBING WITH AMMONIACAL SOLUTIONS

[75] Inventors: Vincent T. Ciuryla, Stony Run; Eugene J. Greskovich, Allentown, both of Pa.

[73] Assignee: Air Products and Chemicals, Inc., Allentown, Pa.

[21] Appl. No.: 820,480

[22] Filed: Jul. 29, 1977

[51] Int. Cl.$^2$ ............................................. C01B 17/00
[52] U.S. Cl. ..................................................... 423/242
[58] Field of Search ................ 423/242, 519, 545, 244

[56] References Cited

U.S. PATENT DOCUMENTS

| | | | |
|---|---|---|---|
| 1,740,342 | 12/1929 | Hansen | 423/242 |
| 1,908,731 | 5/1933 | Clark | 423/242 |
| 1,931,408 | 10/1933 | Hodsman et al. | 423/242 |
| 2,676,090 | 4/1964 | Johnstone | 423/242 X |
| 3,843,789 | 10/1974 | Spector et al. | 423/242 |
| 3,929,967 | 12/1973 | Cann | 423/242 |

OTHER PUBLICATIONS

Pierce, "Estimating Acid Dewpoints in Stock Gases" Chemical Engineering, Apr., 1977, pp. 125-128.

*Primary Examiner*—O. R. Vertiz
*Assistant Examiner*—G. A. Heller
*Attorney, Agent, or Firm*—Thomas G. Ryder; Barry Moyerman

[57] ABSTRACT

A controlled process for the removal of sulfur oxides from gases by scrubbing with ammoniacal solutions in such a manner that the formation of sub-micron liquid particles (fog) is prevented at any point during the scrubbing operation, thereby preventing the formation of a plume (particulate matter) emission in the vapor effluent from the scrubbing.

8 Claims, 1 Drawing Figure

REMOVAL OF SULFUR OXIDES FROM GASES BY SCRUBBING WITH AMMONIACAL SOLUTIONS

BACKGROUND OF THE INVENTION

In recent years, it has become increasingly important to reduce or eliminate sulfur oxides from gases being introduced into the atmosphere. Typical of such gases are the flue gases generated by the combustion of high-sulfur-content fossil fuels.

Although many process for removing sulfur oxides from gases discharged to the atmosphere have evolved over the past few years, one of the most widely accepted and employed techniques is the wet scrubbing of sulfur dioxide-containing flue gases with aqueous ammoniacal solutions. A variety of processes and schemes have been suggested for the efficient and economical removal of sulfur oxides from flue gases utilizing this primary technique. A recent report by the Tennessee Valley Authority (TVA) entitled "Sulfur Oxide Removal From Power Plant Stack Gas; Conceptual Design and Cost Study Series, Study No. 3, Ammonia Scrubbing (Bulletin Y-13), Oct. 1970," has thoroughly discussed this subject and presents numerous process alternatives. Demonstration of the scrubbing process using ammoniacal solutions has been reported by the TVA in cooperation with the Environmental Protection Agency. Results of this work were presented by Hollinden et al. at the Flue Gas Desulfurization Symposium, New Orleans, La., May 14-17, 1973 in a paper entitled "Removal of Sulfur Dioxide From Stack Gases by Scrubbing With Ammoniacal Solutions, Pilot Scale Studies at TVA."

The reaction of sulfur dioxide, water, and ammonia is a well-known reaction forming a solid precipitate either in the vapor phase (see U.S. Pat. Nos. 3,579,296 and 3,928,536) or in the liquid phase of the typical scrubbing operation. Although these previously suggested processes adequately reduce the gaseous sulfur dioxide content in the flue gases being treated, such processes can also yield fine particles of solid ammonium sulfite, ammonium bisulfite, or ammonium sulfate as a result of the vapor-liquid contacting. Such result is not only troublesome, but highly undesirable in that it results in the ultimate discharge of such solid particulate matter to the atmosphere and can readily be seen as a "plume" at the top of the stack. In this connection, U.S. Pat. No. 3,843,789 addresses itself to the controlled scrubbing of sulfur oxides from flue gases using ammoniacal solutions in order to prevent solid particulate formation in the vapor phase either before, within, or after the scrubber. While such procedure is operable and does effect the elimination of "plume" in certain instances, there are other cases when the techniques of this patent do not eliminate the formation of plume.

THE PROBLEM

In the stack gas being discharged from an ammonia scrubbing process of the type described above, there has been observed a plume of particulate matter being discharged into the atmosphere. While such plume can be eliminated at times by the employment of conditions selected to prevent the direct formation of solid particulate matter in the scrubbing operation, the presence of the unsightly and undesired plume of solid particulate matter still persists in many instances.

SUMMARY OF THE INVENTION

It has now been found that the appearance of the plume in the stack gas discharge from the ammoniacal scrubbing of sulfur oxide-containing flue gases can be eliminated by controlling the operating conditions throughout the scrubbing operation so as to prevent the formation of liquid particulates (fog) in the vapor phase within the scrubber. In accordance with the present invention, when scrubbing a sulfur dioxide-containing gas with an aqueous ammoniacal solution, plume formation can be prevented by maintaining controlled conditions of temperature and humidity throughout the gas phase of the scrubbing operation relative to the composition of the ammoniacal scrubbing solution such that at each point within the gas phase, the temperature at such point is above about the dew point at that point in the system. More particularly, this invention requires maintaining the gas phase temperature and liquid phase temperature relative to the liquid phase concentrations of ammonium sulfite, ammonium bisulfite, and ammonium sulfate such that the temperature of the gas phase is at least above about the dew point. While the temperature of the gas phase may vary somewhat from the dew point temperature for a particular point within the system, the formation of plume is detected as soon as the temperature of the gas phase drops any significant amount below the dew point. At times a deviation of as much as 3.0° F. below the dew point can be tolerated for a short period without plume formation. Generally, the temperature is maintained at a level of no more than about −2.0° or −1.5° F. relative to the dew point temperature. A temperature deviation of −0.5° F. relative to the dew point can usually be tolerated for significant periods of time.

It has also been found that in a typical flue gas scrubbing operation, the formation of sub-micron aqueous liquid particles containing ammonium sulfite and ammonium bisulfite, which theoretically can easily be maintained, tend to react with the oxygen in the flue gas, thereby converting such compounds to the corresponding sulfates. Thus, while a minor reheating might be effective to decompose and vaporize ammonium sulfite and ammonium bisulfite, several hundred degrees of reheat are necessary to decompose the ammonium sulfate particulate once it has been formed. In effect then, it is not only necessary to eliminate the direct formation of *solid* particulates in order to eliminate plume (as suggested by the prior art), but the formation of submicron *liquid* aqueous particulates containing ammonium sulfite, bisulfite, and sulfate must also be prevented in order to eliminate the plume.

Additionally, the present invention not only recognizes the importance of preventing fog formation in the bulk vapor phase, but also recognizes the extreme significance of preventing the formation of fog during the intimate contacting of the gas with the scrubbing liquid on each stage. Thus, it is a significant part of this invention to prevent fog formation during the dynamic contacting of gas and liquid during the scrubbing operation.

As mentioned above, the key to the proper operation of this invention is the maintenance of the temperature and humidity of the gas during the contact relative to the particular composition of the scrubbing solution such that the temperature of the gas is greater than the dew point (although a temperature of up to about 1.0° F. below the dew point is acceptable) calculated for the gas at that point in the system. The relative humidity of the gas will generally be somewhat high in a typical scrubbing operation and normally will be at least at a level of 50% relative humidity. Although the technique of this invention is operable at levels of relative humidities below about 50%, there is not believed to be any significant advantage to be gained when confronted with a gas having a relative humidity of less than about 20 to 30%. The likelihood of such phenomenon occurring, however, is remote.

The temperature of the gas phase which must be maintained at a particular point in the system is calculated from the dew point of the gas at that point. As will be understood, the dew point of the gas is a function of the mole fractions of the components of the ammoniacal scrubbing solution and the distribution coefficients for such components. Thus, the formation of fog during the contacting of gases containing sulfur oxides with an ammoniacal solution can be described using vapor-liquid equilibrium considerations. A particularly critical area, and one which is often overlooked, is the vapor-liquid interface which exists both at the interface between the bulk liquid on a tray and the bulk vapor above the tray, as well as, for example, at the interface between a rising vapor bubble and its surrounding liquid on a tray. While the maintenance of proper conditions to avoid the formation of fog in the bulk vapor phase is obviously important, it is equally important to prevent fog formation at the interface between a gas and an ammoniacal scrubber liquid. At the interface, the temperature and the concentrations of $NH_3$, $SO_2$ and $H_2O$ which exist in the gas film, range from those of the bulk gas to those in equilibrium with the bulk liquor. If the dew point at any position within this gas film exceeds the temperature of the gas at this position, a droplet of fog can form. As mentioned previously, this fog droplet is not readily removed in the scrubbing operation and can give rise to the formation of "plume" in the stack exit. Thus, it is extremely important to examine the equilibrium conditions existing in the gas film at the vapor-liquid interface and insure that temperatures in all positions are above the dew point at such position.

In general multicomponent vapor-liquid equilibria, the dew point equation can be expressed as:

$$\sum_{i=1}^{n} \frac{y_i}{K_i} = 1$$

wherein n is the number of components; $y_i$ is the mole fraction of a component i in the vapor phase; and $K_i$ is the distribution coefficient of component i at a particular temperature (T) and pressure. As applied to the present consideration of the aqueous ammoniacal scrubbing solution, this equation then becomes essentially:

$$\frac{y_{NH_3}}{K_{NH_3}} + \frac{y_{SO_2}}{K_{SO_2}} + \frac{y_{H_2O}}{K_{H_2O}} = 1$$

As will be understood, this equation can be used for determining the dew point of a particular vapor mixture of ammonia, sulfur dioxide, and water. By detecting the actual temperature of the given vapor mixture, it can be determined whether the actual temperature is above or below the dew point and, if necessary, action can be taken (such as preheating the gas) so as to raise the temperature of the vapor mixture above the dew point of such mixture.

Another facet of this invention can be understood by a consideration of Johnstone's equations which correlate vapor pressure to the composition of the liquid phase with which the vapor is in equilibrium. For the particular system in question, wherein a strong acid is not present, the Johnstone equations representing the vapor pressure of sulfur dioxide, ammonia and water are as follows:

$$P_{SO_2} = M \frac{(2S - C)^2}{(C - S)}$$

$$P_{NH_3} = N \frac{C(C - S)}{(25 - c)}$$

$$P_{H_2O} = p_w \frac{100}{100 + C + S}$$

In the above equations, S represents the moles of sulfur dioxide per 100 moles of water, C represents the moles of ammonia per 100 moles of water, and $p_w$ represents the vapor pressure of pure water; while M and N are coefficients relating the vapor pressures to solution temperature. Specifically, the values of M and N are represented by the following equations wherein T is temperature in °K:

$$\log_{10} M = 5.865 - 2369/T$$

$$\log_{10} N = 13.680 - 4987/T$$

The Johnstone equations indicate that the equilibrium partial pressures over a solution of sulfur dioxide, ammonia, and water are determined by the composition of the liquid. Accordingly, an alteration in the composition of the ammoniacal scrubbing solution will result in a corresponding alteration of the partial pressure of the components in equilibrium with the solution. As will be understood, the partial pressures of the components in the vapor phase are related to the mole fractions of such components in the vapor phase. It follows that an alteration of the composition of the scrubbing solution will result in an alteration of the mole fraction of the components in the vapor phase in turn resulting in a shift of the dew point of the particular vapor mixture. Thus, in accordance with this invention, the dew point of the vapor phase above the scrubbing solution can be raised or lowered so as to insure that the dew point of the vapor phase mixture is sufficiently low relative to the actual temperature of the vapor phase (no more than about 1 to 1.5° F. above actual temperature) in order to prevent the formation of fog.

It will also be seen from the phenomenon represented by the above equations that it is also possible to shift the dew point of a vapor mixture by altering the relative humidity of such vapor. This alteration can be accomplished in several ways including, for example, adding moisture to the vapor prior to contacting the scrubbing solution or by removing water from such vapor such as, for example, by contacting with a desiccant.

From a consideration of the foregoing, it will be seen that the temperature of the gas phase relative to the dew point can be altered by means of changing the temperature of the gas, by making appropriate changes in the composition of the scrubbing solution, by altering the relative humidity of the gas or a combination of such meas. Thus, for example, the flue gas or combustion gas can be heated prior to contact with the ammoniacal srubbing solution so as to increase its temperature and thereby reduce its relative humidity. In this connection, it is preferred that the temperature of the gas phase be such that its relative humidity is less than about 95%. Alternatively, a non-volatile salt can be added to the aqueous ammoniacal solution in order to reduce the partial pressure of water vapor in equilibrium with the ammoniacal solution. This also is effective to reduce the relative humidity of the gas phase and functions to insure that the due point is below the temperature of the gas at this point within the system.

When operating in a typical commercial style wherein a plurality of trays or a packed bed are positioned in a tower thereby resulting in a plurality of gas-liquid contacting stages, the gas entering any one or more or all of the stages can be heated prior to its contact with the ammoniacal solution in order to increase the temperature of the gas above the dew point and reduce the relative humidity of the gas to some value below about 100%, preferably below about 95%. Similarly, a quantity of a non-volatile salt can be added to the ammoniacal scrubbing solution in any one or more or all of the stages in order to reduce the partial pressure of water vapor in equilibrium with such solution.

The salt which is employed for addition to the ammoniacal scrubbing solution can be any salt which is soluble, albiet only very slightly soluble, in the scrubbing solution and which is also non-volatile at the operating conditions of the system. Illustrative of such salts are those comprising the cations ammonium, barium, beryllium, cadmium, calcium, cerium, cesium, chromium, cobalt, copper, gold, iron, lead, lithium, magnesium, manganese, nickel, potassium, rubidium, silver, sodium, strontium, tin, and zinc. Illustrative of suitable anions are acetate, azide, bisulfate, bisulfite, bromate, bromide, carbamate, carbonate, chloride, chromate, citrate, dichromate, dihydrogen phosphate, dithionate, fluoride, fluorophosphate, fluorosulfonate, hydrogen citrate, hydrogen fluoride, hydrogen phosphate, hydrogen sulfate, hypophosphite, iodide, lactate, nitrate, nitrite, orthophosphate, orthophosphite, oxylate, perchromate, phosphate, phosphite, propionate, salicylate, succinate, sulfate, sulfite, sulfonate tartrate, thiocarbamate, thiocarbonate, and thiosulfate. Preferred salts include the sulfite, bisulfite, sulfate, bisulfate, chloride, nitrate, nitrite, and phosphate salts of ammonium or metals of Group I or Group II. A particularly preferred salt for use in this invention is ammonium sulfate.

As will be understood, the amount of nonvolatile salt added to the ammoniacal scrubbing solution will depend upon the level of fogging prevention desired, and the greater the quantity of salt added to the solution, the greater will be the effect upon relative humidity and dew point of the gas. Generally, the addition of any amount of salt whatsoever will have some effect upon the prevention of fogging, and as a practical matter, the more salt added, the greater will be the effect—up to the solubility limit of the particular salt selected. Quantities of salt beyond the solubility limit can, of course, be added, but there is no practical value to be gained by doing so and, at times, addition of gross quantities in excess of the solubility limit will result in significant quantities of salt crystals forming in the scrubbing column. The presence of such solids in the scrubbing solution is obviously not desirable. To illustrate the level of salt addition which is practicable, reference is made to ammonium sulfate [$(NH_4)_2SO_4$] at an assumed temperature of 140° F. or 60° C. In such situation, the quantity of salt which can be added up to the limit of solubility would be 46.64 grams of salt per 100 grams of saturated scrubbing solution. This is equivalent to the valve of $A = 11.91$ moles $SO_4^{--}$ per 100 moles $H_2O$.

In the following laboratory scale examples the equipment employed is schematically represented in FIG. 1. Essentially, this apparatus includes a gas inlet line 10 leading to heater 12 wherein the incoming flue gas can be preheated. Line 14 is employed to transfer heated gas from heater 12 into humidifier 16 which is equipped with water inlet and outlet lines 18 and 20, respectively. In humidifier 16, water, in vapor form, can be added to the gas so as to provide a gas having a relative humidity up to 100%. Gas is removed from humidifier 18 by means of line 22. A sulfur dioxide inlet line 21 is provided which permits the introduction of quantities of $SO_2$ into the stream of line 22 thereby permitting adjustment of $SO_2$ level in the gas stream at any desired concentration. The gas stream of line 22 is then passed through a second heater 23 which permits a final adjustment of the temperature of the gas prior to its introduction into the bottom of scrubbing column 24 by means of line 25.

It is to be understood that this Figure is merely a schematic illustration of the equipment and does not purport to be an exact representation of the equipment actually employed. With this in mind, the drawing shows that scrubbing column 24 is equipped with an inlet line 26 for the brine or ammoniacal scrubbing solution. Inlet line 26 communicates with downcomer 28, thus providing for flow of the scrubbing solution out of the bottom of downcomer 28 and across tray 30 with the level of scrubbing solution being maintained on tray 30 by means of weir 32. Solution overflowing weir 32 falls into downcomer 34 from whence it is removed by outlet line 36. Although not specifically illustrated in the drawing, tray 30 can be any suitable vapor-liquid contacting device of the type well-known in the art such as, for example, a sieve tray, packed column, or a bubble cap tray.

Scrubbing column 24 operates in the manner well-known in the art whereby the vapor is bubbled upwardly through the liquid contained on a tray, and the contacted vapor is removed from the column overhead, thereby effecting countercurrent contacting of the vapor and liquid. As shown in FIG. 1, the contacted gas is removed from scrubbing column 24 by means of overhead line 38 and is then passed to reheater column 40.

Column 40 is provided with a heating jacked 42 located externally of column 40. The jacket 42 functions to maintain the interior of column 40 at the desired temperature. Internally, column 40 is provided with means for detecting smoke formation in the form of an opacity meter or transmissometer. In FIG. 1 this equipment is illustrated by an illumination means 44 located at the upper end of column 40 and capable of delivering a focused beam of light. At the lower end of column 40 is positioned a reflector 46 designed to reflect the focused beam of light from illumination means 44 back to a light intensity detecting means 48, also located at the upper end of column 40.

An outlet line 50 is also connected to column 40 for the purpose of removing therefrom gas which has been scrubbed with an ammoniacal scrubbing solution.

In order to illustrate this invention in greater detail, reference is made to the following examples wherein the values shown for temperatures, relative humidities, and other parameters measured during the course of individual runs are average values.

EXAMPLE 1

In this example the brine in scrubbing column 24 had a ph of 5.43 a density of 1.186 grams per milliliter and had the following analysis expressed as moles per 100 moles of water:

$NH_3(C) = 11.37$
$SO_2(S) = 8.32$
Sulfates $(A) = 0.96$

The $SO_2$-containing gas stream introduced via line 10, is heated in heater 12 and then humidified in humidifier 16 so as to provide an inlet stream having and inlet vapor temperature $(T_v)$ of 117° F. and a partial pressure of water of 67.4 Torr. (This is equivalent to a relative humidity of 83.8% under these conditions.) In this particular run heater 23 was not operating and the gas stream under the above mentioned conditions was passed directly into scrubbing column 24 wherein it was contacted with an aqueous ammonical scrubbing solution (i.e., the brine). The temperature of the outlet brine solution $(T_B)$ measured in the downcomer 34 was 122.5° F. The scrubbed vapor removed from scubber 24 was passed by line 38 into reheater column 40 which contains the transmissometer equipment described previously. During the period of opacity measurement the temperature of the vapor $(T_{op})$ was about 123° F. During the course of this run the $SO_2$ partial pressure of the gas stream was adjusted (by means of $SO_2$ inlet line 21) first to a level of 6800 ppm and data recorded after steady state had been achieved. Later, $SO_2$ partial pressure was adjusted to 8600 ppm and, again after steady state had been achieved, data was recorded. At the level of 6800 ppm a detectable opacity of 0.1% was recorded. (The sensitivity of the transmissometer is 0.05%.) At the partial pressure level of 8600 ppm the opacity level detected by the transmissometer was 0.25%, and there was definite opacity observed visually.

In a second run employing the same brine concentration heater 23 was placed in operation so as to rise the temperature of the vapor influent $(T_v)$ to the scrubbing column to a level of 120° F. The partial pressure of water in the incoming vapor stream was essentially the same as in the previous run at a level of 67.2 Torr. (Under these conditions this resulted in a relative humidity of 76.7%.) In this operation the outlet brine temperature $(T_B)$ was 124° F. as was the temperature $(T_{op})$ in column 40 during opacity measurement. In this run with the $SO_2$ partial pressure adjusted at a level of 6800 ppm there was no opacity observed either visually or by the transmissometer, i.e., opacity=0%. At an $SO_2$ partial pressure level of 8700 ppm, opacity had reached only to the threshold level of 0.1%.

From the above data it will be seen that the technique of increasing the inlet vapor temperature only 3° F. was effective to prevent the formation of fogging at the $SO_2$ partial pressure of 6800 ppm and raised the threshold fog formation up to a partial pressure of 8700 ppm. Thus, it will be seen that reheating inlet vapor stream or flue gas is effective in reducing or eliminating fog or fume formation.

EXAMPLE 2

In this example the brine composition, expressed as mole per 100 moles of water, employed in the scrubbing column was as follows:

$C = 12.73$
$S = 5.97$
$A = 2.83$.

The ph of this brine solutions was 5.54, and the solution had a density of 1.190 grams per milliliter.

In this example three separate runs were conducted at three different levels of relative humidity. During each of the runs the $SO_2$ partial pressure in the gas was also adjusted to two different levels. The operating temperatures, $SO_2$ partial pressures, and opacity readings for the three levels of relative humidity are shown in Table I below.

TABLE I

| Relative Humidity, % | 99 | | 92 | | 83 | |
|---|---|---|---|---|---|---|
| $T_v$, ° F. | 123 | | 121.5 | | 122 | |
| $T_B$, ° F. | 134 | | 132 | | 132 | |
| $T_{op}$, ° F. | 134 | | 132 | | 132 | |
| $P_{SO_2}$, ppm | 8700 | 5000 | 8700 | 5000 | 8700 | 5000 |
| Opacity, % | 0.65 | 0.25 | 0.3 | 0 | 0 | 0 |

From the data shown in Table I above it will be seen that at the relative humidity of 99% there was a clear indication of opacity at both the 8700 and the 5000 ppm $SO_2$ partial pressure levels. By reducing the relative humidity from 99% down to 92% it will be noticed that the opacity at 5000 ppm $SO_2$ partial pressure was zero while the opacity at 8700 was substantially reduced. This is indicative of the reduction of fog formation by reducing the relative humidity. When the relative humidity was reduced to a level of only 83% it will be seen that there was an indication of no opacity at both the 5000 and 8700 ppm $SO_2$ partial pressure levels. Thus, at this level of relative humidity no fog formation was detected.

EXAMPLE 3

In this example, the brine solution initially employed had the following composition:

$C = 5.32$
$S = 3.14$
$A = 0.47$.

Several separate runs were conducted, and in each subsequent run a quantity of ammonium sulfate was added to the brine solution in order to increase the sulate (A) level in the brine solution. In each of the separate runs, the $SO_2$ level of the gas was also adjusted at various levels, and data recorded under steady state conditions. The following Table II sets forth the sulfate level for each of the runs together with the absolute humidity, temperature of the inlet vapor, $SO_2$ partial pressure, opacity detected, and the temperature during opacity readings.

TABLE II

| A | $P_{H_2O}$, Torr. | $T_v$, ° F. | $P_{SO_2}$, ppm. | Op, % | $T_{op}$, ° F. |
|---|---|---|---|---|---|
| 0.47 | 95 | 126 | 1300 | 0.2 | 136–137 |
| | | | 2250 | 0.4 | |
| | | | 3530 | 1.0 | |
| 2.82 | 103 | 128 | 1400 | 0.0 | 138–140 |
| | | | 2250 | 0.1 | |
| | | | 4500 | 0.4 | |
| 5.56 | 99 | 129 | 8700 | 0.0 | 139–40 |
| | | | 10,500 | 0.1 | |
| 7.88 | 108 | 130 | 33,300 | 0.0 | 139.5–141 |

From the above data it will be seen that when operating under substantially similar conditions of inlet vapor temperature and substantially comparable absolute humidity as well as under substantially comparable temperature conditions during opacity readings, increasing the sulfate level in the brine solution was effective to reduce the formation of fog as indicated by the opacity readings. Thus, when operating with the initial brine solution having a value of A=0.47, fog formation was clearly evident as indicated by an opacity reading of 0.2% at the relatively low $SO_2$ partial pressure of only 1300 ppm. With this same scrubbing solution fog formation increased substantially at $SO_2$ partial pressure levels of 2250 and 3530 ppm, as also indicated by the opacity readings. When the sulfate concentration was increased to a level of A=2.823, there was substantially no fog formation at $SO_2$ partial pressure of 1400 ppm, and the threshold level of fog formation appears to be increased to a level of 2250 ppm $SO_2$ partial pressure. When a furthr significant increase in sulfate content was achieved at a value of A=5.560, there was substantially no fog formation even at the elevated $SO_2$ partial pressure of 8700 ppm, and it would appear that the threshold of fog formation was not achieved until an $SO_2$ partial pressure of 10,500 ppm was achieved. With an extremely high sulfate content of A=7.884, even at a $SO_2$ partial pressure of 33,300 ppm there was no detectable fog formation. Thus, it will be seen that increasing the sulfate content in the brine solution through the addition of a non-volatile soluble salt to the brine solution is effective to reduce or eliminate fog formation during the scrubbing operation.

We claim:

1. An improved process for the removal of sulfur dioxide from a sulfur dioxide-containing gas by scrubbing the gas with an aqueous ammoniacal scrubbing solution wherein the formation of plume, comprised of solid particulate matter, is prevented, which process comprises controlling the temperature and humidity throughout the gas phase and the composition of the scrubbing solution, all relative to each other, such that at each point within the gas phase the temperature is higher than about 0.5° F. below the dew point for such point by adding to the aqueous ammoniacal solution a sufficient quantity of a non-volatile, soluble salt to reduce the partial pressure of water vapor in equilibrium with the ammoniacal solution and to establish a relative humidity of the gas phase of less than about 95%.

2. The process of claim 1 wherein the partial pressure of water in the sulfur dioxide-containing gas is adjusted by control of humidification of such gas so as to reduce the relative humidity of the gas phase to less than about 95%.

3. The process of claim 1 wherein the sulfur dioxide-containing gas is heated so as to increase its temperature sufficiently that the relatively humidity of the gas phase is reduced to less than about 95%.

4. The process of claim 1 wherein the sulfur dioxide-containing gas is both heated and subjected to dehumidification such that the relative humidity of the gas is reduced to less than about 95% and the temperature of the gas phase at each point is maintained higher than about 0.5° F. below the dew point for such point.

5. The process of claim 1 wherein the removal of sulfur dioxide by the aqueous ammoniacal solution is carried out in a plurality of stages and the non-volatile soluble salt is added to the ammoniacal scrubbing solution in at least one stage in order to reduce partial pressure of water vapor in equilibrium with the ammoniacal solution of such stage, thereby reducing the relative humidity of the gas phase to less than about 95%.

6. The process of claim 5 wherein the inlet gas to at least one stage is heated so as to increase its temperature sufficiently such that the relative humidity of the inlet gas to such stage is reduced to less than about 95% and the temperature of the gas phase at each point is maintained higher than about 0.5° F. below the dew point for such point.

7. The process of claim 5 wherein the inlet gas to each stage is heated so as to increase its temperature such that the relative humidity of the inlet gas to each stage is reduced to less than about 95% and the temperature of each point of the gas phase throughout the process is maintained higher than about 0.5° F. below the dew point for such point.

8. The process of claim 1 wherein the non-volatile, soluble salt is ammonium sulphate.

* * * * *

UNITED STATES PATENT AND TRADEMARK OFFICE
CERTIFICATE OF CORRECTION

PATENT NO. : 4,151,263   Page 1 of 2
DATED : April 24, 1979
INVENTOR(S) : Vincent T. Ciuryla and Eugene J. Greskovich It is certified that error appears in the above-identified patent and that said Letters Patent are hereby corrected as shown below:

Column 1, Line 11
    Delete "process" and substitute therefor -- processes --

Column 4, Line 10
    Delete "$P_{NH_3} = N\frac{C(C - S)}{(2S - c)}$" and substitute therefor
-- $P_{NH_3} = N\frac{C(C - S)}{(2S - C)}$ --

Column 4, Line 62
    Delete "meas." and substitute therefor -- means. --

Column 4, Line 64
    Delete "srubbing" and substitute therefor -- scrubbing --

Column 5, Line 67
    Delete "valve" and substitute therefor -- value --

Column 6, Line 47
    Delete "jacked" and substitute therefor -- jacket --

Column 7, Line 2
    Delete "millileter" and substitute therefor -- milliliter --

UNITED STATES PATENT AND TRADEMARK OFFICE
CERTIFICATE OF CORRECTION

PATENT NO. : 4,151,263
DATED : April 24, 1979
INVENTOR(S) : Vincent T. Ciuryla and Eugene J. Greskovich It is certified that error appears in the above-identified patent and that said Letters Patent are hereby corrected as shown below:

Column 7, Line 12
    Delete "and" and substitute therefor -- an --

Column 7, Line 39
    Delete "rise" and substitute therefor -- raise --

Column 8, Line 41
    Delete "sulate" and substitute therefor -- sulfate --

Column 8, Line 57
    Delete "139-40" and substitute therefor -- 139-140 --

Column 9, Line 12
    Delete "furthr" and substitute therefor -- further --

Column 10, Line 8
    Delete "relatively" and substitute therefor -- relative --

Signed and Sealed this

Twenty-eighth Day of August 1979

[SEAL]

Attest:

Attesting Officer

LUTRELLE F. PARKER
Acting Commissioner of Patents and Trademarks